United States Patent [19]
Walton et al.

[11] Patent Number: 5,123,672
[45] Date of Patent: Jun. 23, 1992

[54] VEHICLE SUSPENSION WITH AUXILIARY LEAF SPRING WITH ROLL CONTROL SYSTEM

[75] Inventors: Erlen B. Walton; Frank J. Waksmundzki, both of Farmington Hills, Mich.

[73] Assignee: Eaton Corporation, Cleveland, Ohio

[21] Appl. No.: 645,780

[22] Filed: Jan. 25, 1991

[51] Int. Cl.⁵ ................. B60G 11/04; B60G 17/02
[52] U.S. Cl. .................... 280/772; 280/699; 280/718; 280/720; 267/45; 267/263; 267/265
[58] Field of Search ............ 280/699, 718, 720, 703, 280/669, 772; 267/40, 260, 263, 261, 45, 265

[56] References Cited

U.S. PATENT DOCUMENTS

| | | | |
|---|---|---|---|
| 1,362,037 | 12/1920 | Peterson | 267/45 |
| 2,304,780 | 12/1942 | De Fries | 267/28 |
| 2,714,003 | 7/1955 | Focht | 267/45 |
| 2,825,578 | 3/1958 | Walker | 280/715 |
| 3,094,341 | 6/1963 | Alfieri | 280/712 |
| 3,197,231 | 7/1965 | Holzman | 280/683 |
| 3,241,854 | 3/1966 | Hamilton | 280/669 |
| 3,484,091 | 12/1969 | Draves | 267/54 |
| 3,765,698 | 10/1973 | Burrell | 280/669 |
| 3,869,140 | 3/1975 | Allison | 267/41 X |
| 4,456,232 | 6/1984 | Shinbori et al. | 280/718 X |
| 5,015,009 | 5/1991 | Ohyama et al. | 280/772 |

Primary Examiner—Charles A. Marmor
Assistant Examiner—Tamara L. Graysay
Attorney, Agent, or Firm—P. S. Rulon

[57] ABSTRACT

Selectively engagable auxiliary leaf springs (38) for vertically supporting a vehicle chassis (32) on an axle assembly (22) in parallel with main suspension springs (34). Forward and rear ends (38b,38a) of the auxiliary leaf springs are pivotally attached to the vehicle chassis and the axle assembly, and pivotal movement of the forward ends (38b) is inhibited or prevented by engagement of actuator assemblies (56 or 100 or 170) to engage the auxiliary leaf springs. A control system automatically engages the actuator assemblies in response to load added to the vehicle and/or vehicle steering movement and/or rapid vehicle acceleration.

7 Claims, 4 Drawing Sheets

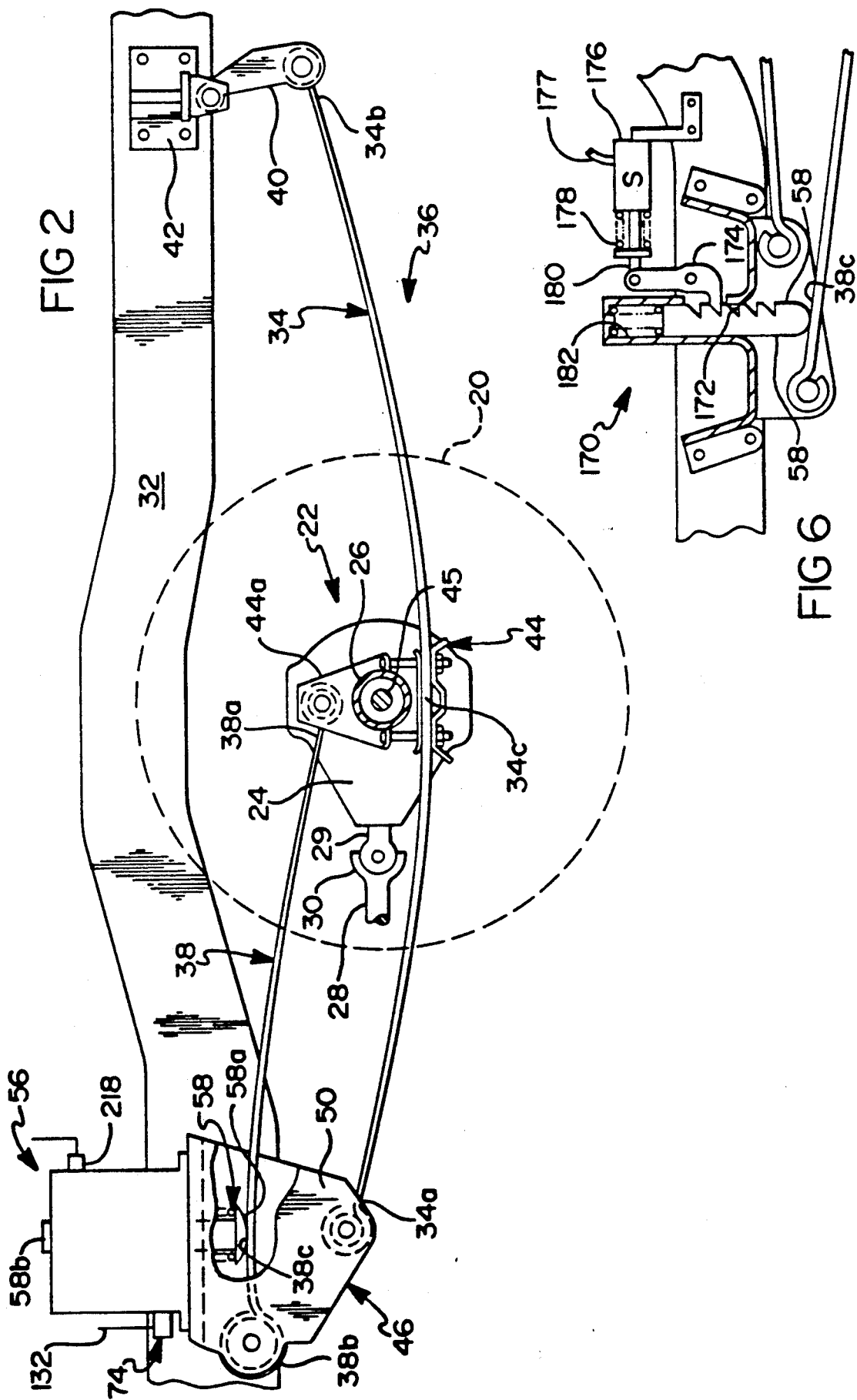

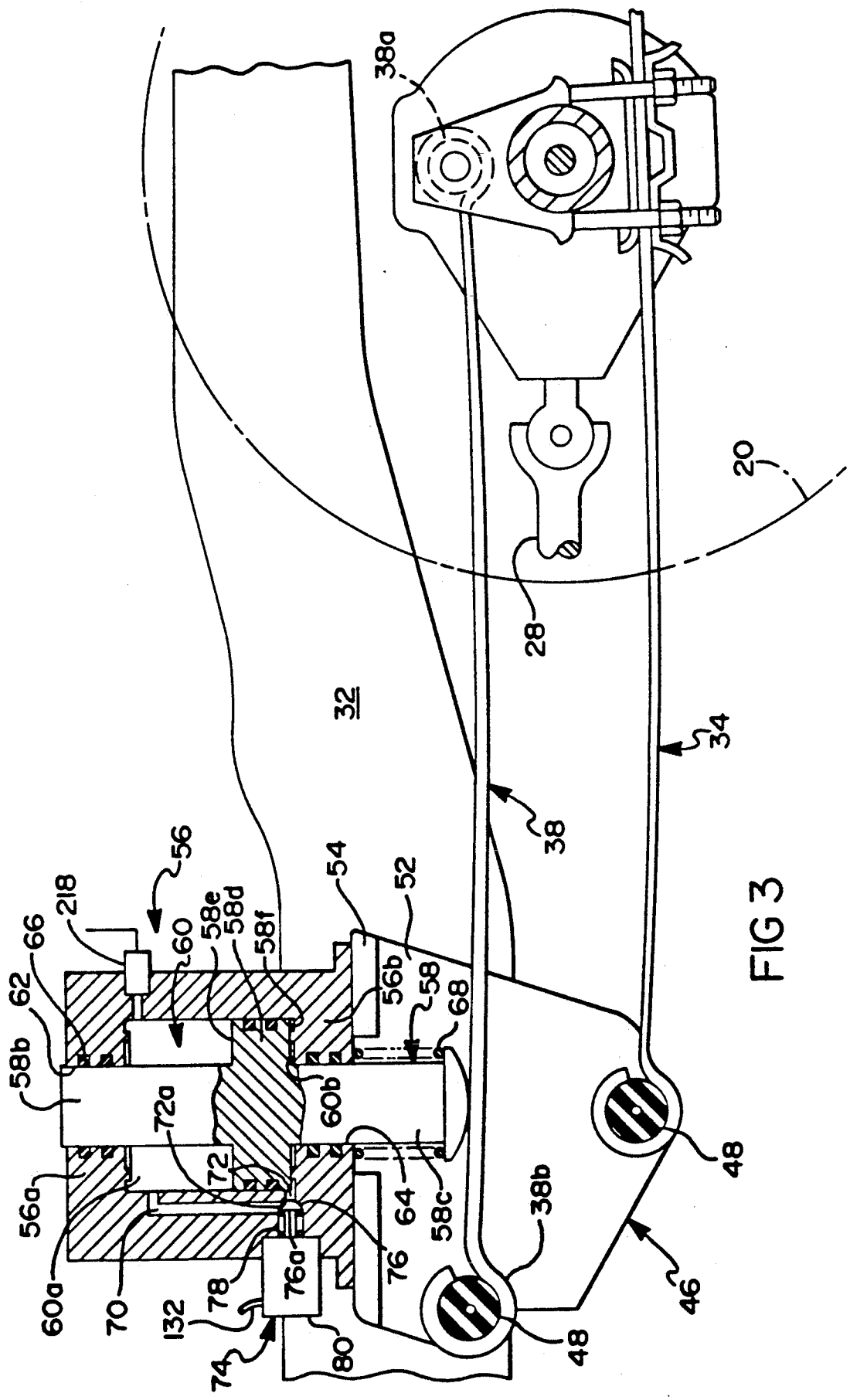

VEHICLE SUSPENSION WITH AUXILIARY LEAF SPRING WITH ROLL CONTROL SYSTEM

CROSS-REFERENCE TO RELATED APPLICATIONS

This application is related to U.S. application Ser. Nos. 07/456,872; 07/456,914; 07/457,025; 07/457,026; 07/457,065; 07/457,068; and 07/457,069 all filed on Dec. 26, 1989. This application is also related to U.S. application Ser. Nos. 647,108 and 645,922 filed the same date as this application. All of the above applications are assigned to the assignee of this application and all are incorporated herein by reference.

FIELD OF THE INVENTION

This invention relates to auxiliary or helper springs for vehicle suspension systems. More particularly, this invention relates to selectively engagable auxiliary leaf springs.

BACKGROUND OF THE INVENTION

Selectively engagable auxiliary leaf springs are known in the prior art as may be seen by reference to U.S. Pat. No. 3,484,091 to Draves, and incorporated herein by reference. The Draves patent discloses left and right ground engaging wheels rotatably mounted on opposite ends of an axle assembly extending transverse to a longitudinal axis of a vehicle chassis, left and right main suspension springs of the leaf or coil type vertically supporting the chassis on the axle assembly, left and right generally longitudinally extending auxiliary leaf springs each having an end pivotally affixed to the chassis and an unaffixed or free end, and an actuator assembly selectively operative to move the free end into load supporting engagement with the axle assembly. Such an auxiliary spring arrangement allows the main suspension springs to be designed for ride comfort when the vehicle is unloaded or lightly loaded, and is particularly well suited for light duty utility vehicles such as pick-up trucks which are used more for commuting than load hauling. However, since the auxiliary leaf springs of Draves have an unattached or free end they can only function to help support load, also the free ends of the auxiliary springs can clash against the axle and produce annoying noise.

SUMMARY OF THE INVENTION

An object of the present invention is to provide an improved roll control system for engaging auxiliary leaf springs.

According to a feature of the invention, a vehicle comprises left and right ground engaging wheel mechanisms rotatably mounted on opposite ends of an axle assembly extending transverse to a longitudinal axis of a vehicle chassis assembly. Main spring means vertically support the chassis assembly on the axle assembly. Left and right transversely spaced apart and generally longitudinally extending auxiliary leaf springs each have first and second ends pivotally attached respectively to the chassis and axle assemblies. The leaf springs are selectively operative to vertically support the chassis assembly on the axle assembly in parallel with the main spring means in response to engagement of actuator means inhibiting pivotal movement to an end of each leaf spring.

The invention is characterized by:

means for sensing left and right steering movement of the steering means to respectively effect left and right steering movement of the vehicle and operative to produce left and right steering signals in response to the steering movement; and means for effecting engagement of at least the right actuator means in response to the left steering signals, and for effecting engagement of at least the left actuator means in response to the right steering signals.

BRIEF DESCRIPTION OF THE DRAWINGS

A vehicle suspension system employing the auxiliary leaf springs according to the invention is shown in the accompanying drawings in which:

FIG. 2 is a side elevational view of the left rear portion of a suspension system;

FIG. 3 is an enlarged partial view of FIG. 2 with a spring attachment plate removed to illustrate forward mounting of the main and auxiliary leaf spring ends, and with a sectional view of the auxiliary leaf spring actuator;

FIGS. 5 and 6 illustrate alternative actuators for the auxiliary leaf springs of FIGS. 2, 3 and 4.

DETAILED DESCRIPTION OF THE DRAWINGS

Figure 1:
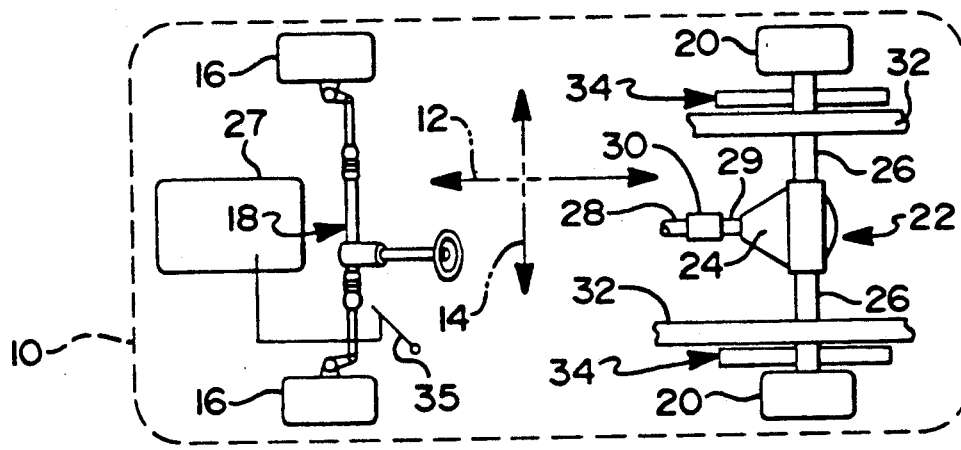
FIG. 1 is a schematic plan view of a vehicle.

The schematic plan view of FIG. 1 illustrates a wheeled vehicle having a body represented by phantom line 10, longitudinal and transverse axes 12, 14, left and right front wheels 16, a steering assembly 18 for dirigible front wheels, left and right rear wheels 20 rotatably supported on opposite ends of a rigid and transversely extending rear drive axle assembly 22 having a differential gear assembly disposed in a differential housing 24 rigidly affixed to transversely extending tube portions 26, an engine 27 connected in known manner to a drive shaft 28 connected to the differential gear assembly pinion shaft 29 by a flexible joint such as a universal joint 30 shown in FIG. 2, partially shown chassis rails 32, and first and second longitudinally extending main leaf springs 34 each having opposite ends 34a, 34b in load supporting relation (see FIG. 2) with the chassis rails and each having an intermediate portion 34c affixed to the axle assembly. The vehicle is preferably a utility type vehicle such as a light truck having an area above rear axle assembly 22 for carrying a load. Engine power is controlled by an accelerator 35 in known manner. Main leaf springs are preferably of the tapered single or double leaf type with spring rates and load carrying capacity selected for vehicle riding comfort when the vehicle is unloaded, lightly loaded, or not operating on rough surface, i.e., the springs 34 are designed to provide support for the unloaded or tare weight of the vehicle. For purposes of the present invention, the axle assembly 22 may be a rigid drive or non-drive axle, may support the chassis on other than leaf springs 32 (e.g., coil springs), may be other than rigid (e.g., an axle assembly for independent wheel suspension), or may be other than a rear axle.

Looking now at FIGS. 2 and 3, therein is shown a suspension embodiment 36 of the present invention for the left side of axle assembly 22. The right side is the same and is not shown for brevity. Embodiment 36 includes a known, underslung main leaf spring suspension modified to include an auxiliary or helper leaf spring 38 which is selectively engagable to vertically support the vehicle chassis in parallel with main leaf spring 34 during any of several different operating conditions requiring suspension 36 to have additional load capacity and/or spring rate, e.g., when the vehicle is heavily loaded and/or operating on rough surface and/or when the vehicle is unloaded or lightly loaded and is being steered left or right and/or is being rapidly accelerated. The auxiliary leaf springs also function as traction or drag links, which mitigate distortion of main leaf springs due to drive and braking torque, and which readily control angular changes in the drive angle between drive and pinion shafts 28, 29 due to distortion of main leaf springs 34 and variations in the relative vertical positions of the chassis and axle assembly. The auxiliary leaf springs are preferably of the tapered single leaf type.

The rear end 34b of each spring 34 is pivotally attached to chassis rail 32 in known manner by a shackle and bracket 40, 42. A bracket assembly 44 rigidly affixes intermediate portion 34c to the underside of axle tube 26 at a position radially spaced from the rotational and transversely extending axis of a stub shaft 45 drivingly interconnecting wheels 20, and the differential. Bracket assembly 44 includes a pair of upwardly extending and transversely spaced apart flanges 44a (only one shown) for pivotally affixing an end 38a of auxiliary leaf spring 38 to the axle assembly at a position diametrically opposite spring portion 34c. The front or forward ends 34a and 38b of the main and auxiliary leaf springs are pivotally attached to a bracket assembly 46 rigidly affixed to chassis rail 32. The pivotal attachments of the main and auxiliary spring ends may include elastomeric bushings 48 in known manner as shown in FIG. 3.

Bracket assembly 46 includes transversely spaced apart side plates 50, 52 and an upper plate 54 rigidly affixed to and spacing the side plates apart. Side plate 50 is partially broken away in FIG. 2 to show side plate 52 and is cut away in FIG. 3. Upper bracket plate 54 provides a mounting surface for an actuator assembly 56 selectively operative via engagement of a surface 58a of a reaction member 58 with a surface 38c to prevent or inhibit upward pivotal movement of auxiliary leaf spring end 38b. When reaction member 58 is free to move up and down, auxiliary leaf spring end 38b is free to pivot and main leaf spring 34 provides sole or substantially sole load support for the chassis.

Since each auxiliary leaf spring 38 is pivotally affixed at its ends 38b, 38a to the chassis and the axle assembly and since each auxiliary spring between ends 38b, 38a is generally in spaced parallel relation to the portion of the associated main leaf spring 34 between end 34a and intermediate portion 34c, it also functions as a drag or traction link which mitigates distortion of main leaf spring 34 due to drive and/or braking torque and which readily controls angular changes in drive angle between drive and pinion shafts 28, 29 due to main leaf spring distortion and variation in the relative vertical positions of the chassis and axle assembly. Such drive angle changes are readily controlled by varying the length of the auxiliary leaf, e.g., shortening auxiliary leaf spring 38 in embodiment 36 will provide a nose down attitude of pinion shaft 29 as the vertical distance between chassis and axle assembly decreases due to increased load on the chassis or jounce of the axle assembly. Main leaf spring 34 may be of the single or multiple leaf type. Further, the main and/or auxiliary leaf springs may be of the tapped type as known in the art. Since auxiliary leaf spring 38 is attached at both ends, it also is effective to maintain the axle assembly in position should the main leaf spring break.

Actuator assembly 56 includes a housing assembly rigidly affixed to upper plate 54, a cylindrical chamber 60 co-axially aligned with bores 62, 64 extending through upper and lower end walls 56a, 56b of the housing assembly, the reaction member 58 having end rod portions 58b, 58c slidably disposed in bores 62, 64 and a piston portion 58d slidably disposed in chamber 60, a plurality of O-ring type seals 66 for sealing the cylindrical interface of the rods and piston with the housing assembly, a relatively low force spring 68 for biasing the reaction member downward, passages 70, 72 for allowing free flow of a fluid in the chamber to opposite sides 58e, 58f of the piston in response to reciprocating movement of the reaction member by the auxiliary leaf spring, and a solenoid assembly 74. The opposite sides 58e, 58f divide chamber 60 in chambers 60a, 60b which vary inversely in volume in response to reciprocating movement of reaction member 58. Assembly 74 includes a valving member 76 having a shoulder 76a acted on by a spring 78 for biasing a surface of the valving when against a valve seat 72a defined by an end of passage 72, and a solenoid 80 operative when energized to move the valving member counter to the force of spring 78 to unseat the valving member and allow free fluid flow between the passages. Accordingly, valving member 72 and seat 72a, when engage, lock or inhibit the reaction member against upward movement.

Chamber 60 is preferably completely filled with a compressible silicon oil or fluid, e.g., General Electric Silicon Fluids such as dimethyl polysilocane or methyl phenyl polysiloxane. The thermal expansion of the housing assembly and the fluid therein is selected in combination with the compressibility of the fluid to mitigate pressure build up within the housing due to temperature change. Alternatively, relatively incompressible oils may be used in combination with compressible means in the chamber or in communication with the chamber. During vehicle operation with valving member 76 unseated by solenoid 80, reaction member 58 freely reciprocates in chamber 60 in response jounce of the axle assembly, whereby the actuator assemblies and the auxiliary leaf springs are disengaged and provide only minor increases in the upward jounce rate of the suspension system. Further, the area of the upper surface 58e of piston 58 may be made larger than the area of the lower surface 58f. This is readily done by making the diameter of rod portion 58b smaller than the diameter of rod portion 58c. When this is done, the fluid in chamber 60 may be initially pressurized so as to bias the piston downward with a force sufficient to replace spring 68. Spring 68 and/or the initial pressurizing of the fluid form tracking means for effecting tracking of the reaction members with the auxiliary springs. The force provided by spring 68 and/or initial pressurization should be sufficient to unseat valving member 76 against the force of spring 78, whereby the reaction member 58 will tend to assume the position in FIG. 3 should solenoid assembly 74 or the controls therefor become inoperative. When valving members 76 are seated, free reciprocation of reaction members 58 is prevented, whereby the actuators and auxiliary leaf springs are engaged to increase vehicle load capacity, vehicle roll stiffness during steering maneuvers, and vehicle squat during when the vehicle is rapidly accelerated from a rest position.

Figure 4:
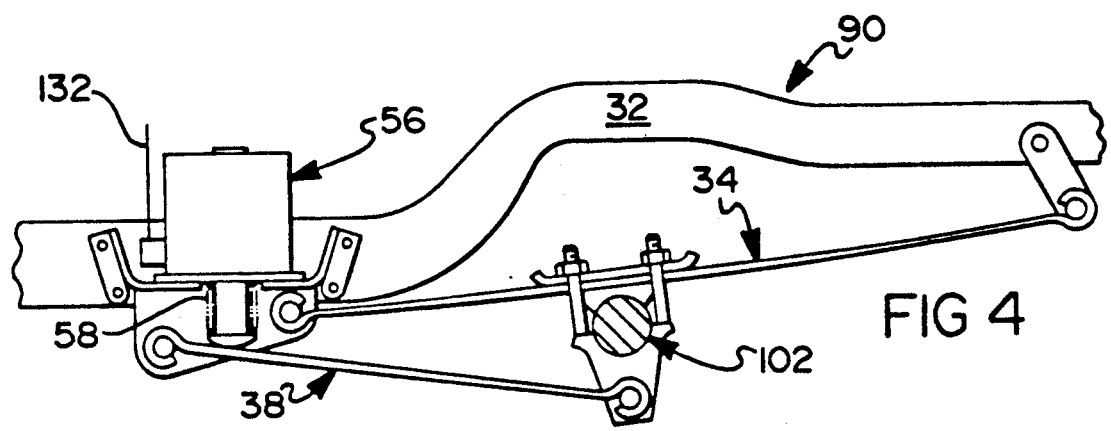
FIG. 4 illustrates the auxiliary leaf spring employed with a different suspension system.

In the suspension embodiment 90 of FIG. 4 auxiliary leaf spring 38 is employed with an over slung main leaf spring 34 attached to the top of an axle assembly 102 which may be a rigid non-drive axle, as shown, or drive axle as in FIGS. 2 and 3. Otherwise suspension system 90 is the same as system 36.

Figure 5:
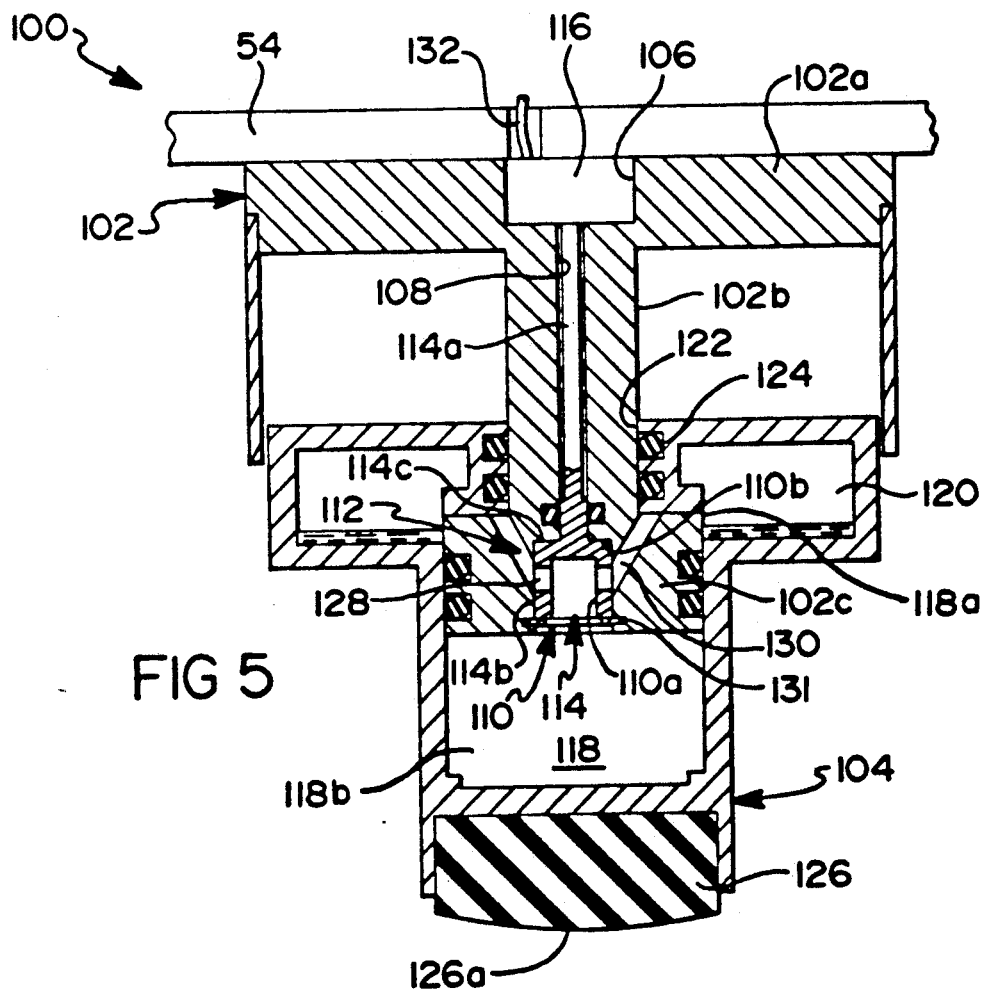

FIG. 5 illustrates an alternative actuator assembly 100 which is readily substituted for actuator assembly 56 by increasing the vertical distance between upper plate 54 and auxiliary spring 38 and inserting assembly 100 therebetween. Assembly 100 includes a fixed piston assembly 102 and a movable housing assembly 104. Piston assembly 102 includes an upper support portion 102a adapted to be rigidly affixed to the underside of plate 54, a downwardly extending rod portion 102b, and a piston portion 102c. Disposed within stepped bore portions 106, 108, 110 of piston assembly 102 is a rotary valve assembly 112 having a valving member 114 connected to a torque motor 116 via a shaft portion 114a extending therebetween. Housing assembly 104 includes a cylindrical working chamber 118 slidably receiving piston portion 102c, a toroidally shaped reservoir 120, a bore 122 slidably receiving rod portion 102b, a plurality of O-ring type seals 124 for sealing the interface of the rod and piston portions with housing assembly, and a bumper 126 having a curved surface 126a for reacting against leaf spring surface 38c.

Valving member 114 includes a skirt portion having a radially outer cylindrical surface 114b in sliding/sealing relation with inner cylindrical surfaces 110a for bore 110, a pair of radially extending openings 128 extending through diametrically opposite sides of the skirt portion and aligning with diagonally upwardly extending passages 130 in the piston for intercommunicating chambers 118, 120. The valving member is vertically retained in bore portion 110 via a snap ring 131. Valving member 114 which provides substantially the same locking function as valving member 76, is rotated ninety degrees to a closed position to prevent the intercommunication of the chambers by applying an electrical signal to a conductor 132 of torque motor 116 and is rotated ninety degrees in the opposite direction to the shown open position to allow the free intercommunication of the chambers by applying an electrical signal of opposite polarity. Chambers 118, 120 may be filled with a silicone oil as previously described or, as preferred, by a compressible or relatively incompressible oil and a gaseous fluid such as nitrogen.

When the piston portion is in the position shown, chamber 118 is preferably completely full of the oil, chamber 120 may have a small amount of the oil therein, and the remainder of chamber 120 is charged with the gaseous fluid to a pressure sufficient to keep bumper surface 126a in contact with the auxiliary spring. Herein gaseous pressure of one-hundred pounds per square inch is considered sufficient. When piston portion 102c is in the position shown, valving member is closed and weight is added to the vehicle sufficient to require load support by the auxiliary leaf springs, rotation of the valving member to the open position is preferably prevented. This may be done in several ways. For example, since the pressure of the trapped oil in chamber 118 increases relative to the pressure in chamber 120 as vehicle or chassis weight increases, the higher pressure in the chamber 118 will vertically bias valving member upward to increase the engaging force between a bore portion shoulder 110b and an upper surface 114c of the valving member. This engaging force may then be employed to prevent rotation of the valving member by torque motor 116 within a predetermined time as discussed further hereinafter.

FIG. 6 illustrates an actuator assembly 170 wherein the position of a reaction member 58 having ratchet teeth 172 is controlled by a pivotal pawl assembly 174 movable into and out of engagement with ratchet teeth 172 in the reaction member for providing selective locking of the reaction member in a manner analogous to that of valves 76 and 114. The pawl is engaged by a solenoid assembly 176 connectable to a source of electrical power via a conductor 177. A spring 178 extends the solenoid armature 180 to pivotally disengage the pawl when the solenoid of the solenoid assembly is de-energized. The reaction member is biased downward by a spring 182 with a force sufficient to overcome the force of spring 178 acting on the ratchet teeth. Such ratchet and pawl mechanisms are a species of clutch mechanisms commonly referred to as one-way clutches. To prevent a constant current drawn when the armature is engaged, the solenoid or pawl assemblies may include a latching mechanism. For example, the solenoid assembly may include a latching mechanism which holds the armature in the engaged position when the solenoid is initially energized to engage the pawl and which unlatches in response to momentary re-energization of the solenoid. Solenoid assembly 176 may be employed to rotate valving member 114 in actuator 100.

Figure 7:
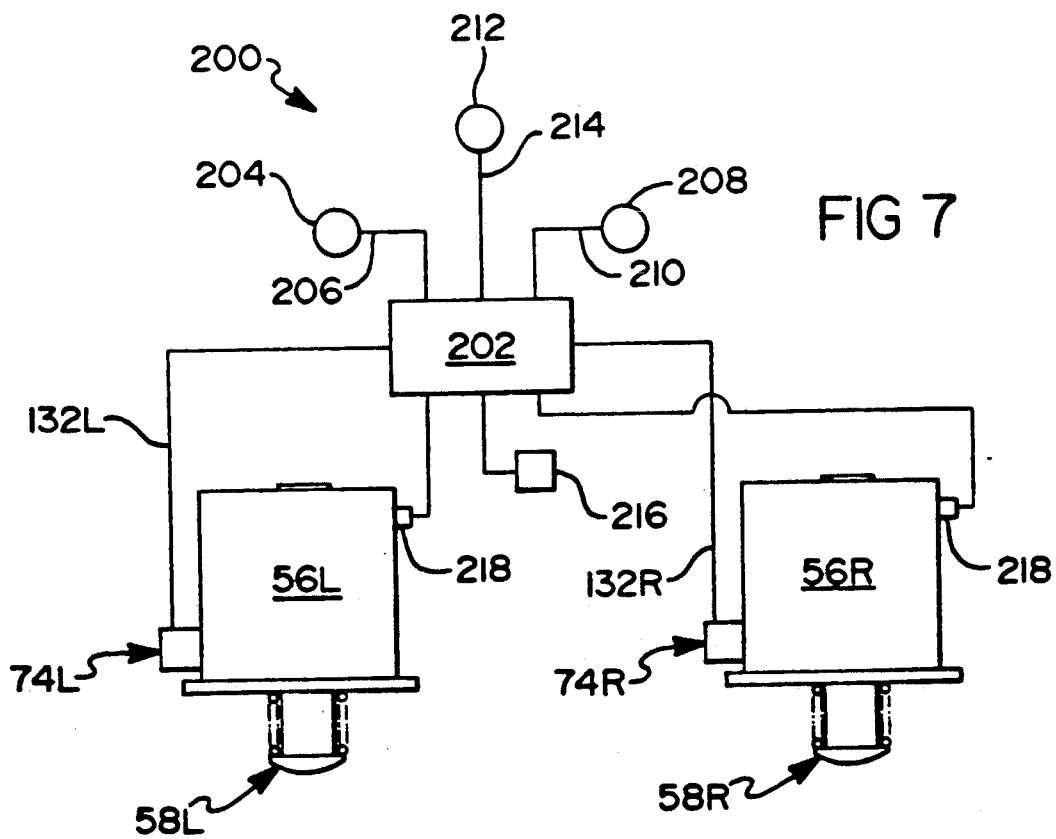
FIG. 7 illustrates a control system of engaging and disengaging the auxiliary leaf springs of FIGS. 2, 3 and 4.

FIG. 7, illustrates a control system 200 for effecting engagement and disengagement of each actuator assembly associated with the left and right auxiliary leaf springs in response to vehicle speed signals, vehicle steering movement signals and/or vehicle rapid acceleration demand signals. The control system includes an electrical or electronic control unit 202 operative to automatically engage and disengage the auxiliary leaf spring actuators via conductors 132L, 132R in response to receiving the speed signals from a speed sensor 204 via a conductor 206 and/or in response to receiving the vehicle steering movement signals from a vehicle steering sensor 208, via a conductor 210 and/or in response to receiving the vehicle acceleration signals from an acceleration sensor 212 via a conductor 214. Sensor 212 may directly sense vehicle or driveline acceleration or rapid changes in engine power demand such as accelerator pedal movement. All of the above sensors are per se well known in the art. The control unit is connected to a source of electrical power 216. Actuators 56 solenoid assemblies 74 and reaction members 58 illustrated in FIG. 7 are designated 56L, 56R, 74L, 74R and 58L, 58R, respectively to indicate their respective association with the left and right auxiliary leaf springs. Actuators 100 and 170 are readily substituted for actuators 56 by merely modifying, as necessary, the electrical signals sent to the actuators by the control unit.

When the vehicle is unloaded or lightly loaded and the speed signals produced by speed sensor 204 indicate that the vehicle is in motion, control unit 202 closes a circuit therein between the source of electrical power 216 and conductors 132L, 132R, thereby energizing solenoids 80 for effecting unseating or opening of valving members 76 counter to the force of springs 78 to allow free or relatively free flow of the fluid between chambers 60a, 60b. When the speed signals indicate that the vehicle is at rest or below a predetermined low speed, the control unit opens the circuit between the electrical power source and conductors 132L, 132R, thereby de-energizing solenoids 80 for effecting seating or closing of valving members 76 by springs 78 to prevent fluid flow from chambers 60a to chambers 60b. Hence, if load is added while the vehicle is at rest, the actuators are pre-engaged to ensure that the auxiliary leaf springs share the added load if necessary. Several different methods may be employed to prevent de-energization of the solenoids when the vehicle is loaded and the put in motion. Herein, a pressure sensor 218, associated with each chamber 60a, is operative while the vehicle is at rest to sense a predetermined pressure increase in either chamber 60a and provide control unit 202 with a load signal. The load signal from either pressure sensor renders control unit 202 unresponsive to the speed signal unit the vehicle is again brought to rest and unloaded. By way of example only, the required predetermined pressure increase may be representative of an increased vehicle weight of from four to five hundred pounds on suspension system 36.

When the steering signals produced by steering sensor 208 indicate that the vehicle is being steered left or right from a straight ahead position while the actuators are disengaged and the vehicle is in motion, control unit 202 opens the circuit therein between the source of electrical power and the one or both solenoid conductors, thereby de-energizing one or both of the solenoids 80 for engaging one or both of the actuators to increase the roll stiffness of the suspension system. If only one actuator is engaged, it of course will be the right actuator if steering is to the left, and the left actuator if steering is to the right. As is well within the state of the art, the control unit may be made unresponsive to steering signals until the speed signals represent a predetermined minimum vehicle speed and/or until the steering signals represent a minimum rate of change of vehicle steering to the left or right.

When the acceleration signals produced by acceleration sensor 212 indicate that a rate of change in engine power demand will cause an abrupt lowering or squat of the rear of the vehicle, control unit 202 opens the circuit therein between the electrical power and the solenoid conductors, thereby de-energizing the solenoid for engaging the actuator to increase the stiffness of suspension 36 and lessen the squat. Of course, if the vehicle is loaded or the rapid acceleration is from the vehicle rest position, control unit 202 merely maintains to open position of the circuit therein.

When actuators 100 are employed with control system 200 in lieu of actuators 56, control unit 202 is provided with means to reverse the polarity of the electrical power to conductors 132L, 132R to effect opening and closing of valving members 114 via motors 116. The control unit is also provided with current sensing means or timer means operative to render the control unit unresponsive to the vehicle speed signals, thereby preventing opening rotation of valving members 114 while the vehicle is loaded and in motion. When the vehicle is loaded while at rest, the fluid pressure in chambers 118 increases in response to the added load as previously described. The increased fluid pressure acts on valving member 114 and increases the frictional engaging force between valving member surfaces 114c and bore portion shoulders 110b. The motors 116 are selected to provide insufficient torque to overcome the increased frictional engaging force thereby stalling the motors. When a current sensor is employed, the sensor detects an increased current draw of either stalled motor and opens the circuit between the electrical power source and conductors 132L, 132R until the vehicle is again at rest. When timer means is employed the timer opens the circuit between the power source and the conductors after a predetermined time. The circuit stays open until the vehicle is again at rest.

When actuators 170 are employed with control system 200 in lieu of actuators 56 or 100, control unit 202 may operate substantially as with actuators 100. For example, added vehicle load increases the engaging force between the teeth of rack and pawl 172, 174. Solenoids 176 are then selected to provide insufficient force to overcome this the engaging force in the predetermined time of the timer.

Several embodiments of the invention have been disclosed for illustration purposes. Many variations of the disclosed embodiments are believed to be within the spirit of the invention. The following claims are intended to cover inventive portions of the disclosed embodiments and modifications thereof which are believed to be within the spirit of the invention.

What is claimed is:

1. A vehicle comprising left and right ground engaging wheel mechanisms rotatably mounted on opposite ends of an axle assembly extending transverse to a longitudinal axis of a vehicle chassis assembly; main spring means vertically supporting the chassis assembly on the axle assembly; left and right transversely spaced apart and generally longitudinally extending auxiliary leaf springs each having first and second ends pivotally attached respectively to the chassis and axle assemblies, each auxiliary leaf spring including a portion intermediate the first and second pivotal ends thereof and each portion being vertically movable relative to the chassis assembly between up and down positions from a first position, the leaf springs selectively operative to vertically support the chassis assembly on the axle assembly in parallel with the main spring means in response to engagement of actuator means inhibiting pivotal movement of one of the first and second ends of the left and right leaf springs and steering means for steering selected vehicle wheels, left and right, from a neutral position; characterized by:

each actuator assembly comprising a housing assembly interposed between the chassis and the portion of the associated auxiliary spring, the housing assembly defining a first chamber divided into first and second inversely variable volumes by a piston assembly disposed therein, the volumes being completely filled with an oil, means rigidly affixing one of the housing and piston assemblies to the chassis and the other being affixed to a movable reaction means, tracking means for positioning the reaction means for movement with the portion between the first and up positions during non-engagement of the actuator means, passage means for allowing relatively free flow of the oil between the volumes in response to relative movement of the housing and piston assemblies, and valving means having a first state for allowing the relatively free flow corresponding to non-engagement of the actuator means and a second state for preventing the relatively free flow corresponding to the engagement of the actuator means;

steer sensing means for producing neutral, and left and right steering signals respectively in response to neutral, and left and right steering movement of the vehicle by the steering means; and control means for effecting the first state of the valving means in response to the neutral steering signals and for effecting the second state of the valving means of at least right actuator means in response to the left steering signals and the second state of the valving means of at least the left actuator means in response to the right steering signals.

2. The vehicle of claim 1, wherein the valving means first and second states are respectively open and closed positions of a valving member.

3. The vehicle of claim 2, wherein the oil is a compressible oil.

4. The vehicle of claim 2, wherein the piston is affixed to the chassis.

5. The vehicle of claim 4, wherein:

the housing assembly includes a second chamber having a pressurized gas therein and having at least a portion thereof disposed above the first chamber; and passage means for continuously communicating the second chamber with the first volume.

6. A vehicle comprising left and right ground engaging wheel mechanisms rotatably mounted on opposite ends of an axle assembly extending transverse to a longitudinal axis of a vehicle chassis assembly; main spring means vertically supporting the chassis assembly on the axle assembly; left and right transversely spaced apart and generally longitudinally extending auxiliary leaf springs each having first and second ends pivotally attached respectively to the chassis and axle assemblies, each auxiliary leaf spring including a portion intermediate the first and second pivotal ends thereof and each portion being vertically movable relative to the chassis assembly between up and down positions for a first position, the leaf springs selectively operative to vertically support the chassis assembly on the axle assembly in parallel with the main spring means in response to engagement of actuator means inhibiting pivotal movement of one of the first and second ends of the left and right leaf springs and steering means for steering vehicle wheels, left and right, from a neutral position; characterized by:

each actuator means including movable reaction means interposed between the chassis and the portion of the associated leaf spring, spring means for biasing the reaction means toward the first position, and one-way clutch means having a non-engaged state corresponding to non-engagement of the actuator means for allowing up and down movement of the reaction means and having an engaged state corresponding to the engagement of the actuator means for mechanically locking the reaction means against the up movement of the reaction means;

steer sensing means for producing neutral, left and right steering signals respectively in response to neutral, left and right steering movement of the vehicle and the steering means; and control means including means for effecting the engaged state of at least the right actuator means one-way clutch means in response to the left steering signals and for effecting the engaged state of at least the left actuator means one-way clutch means in response to the right steering signals.

7. The vehicle of claim 6, wherein:

the one-way clutch means include a ratchet and pawl assembly for mechanically locking the reaction means.

* * * * *